(12) United States Patent
Ha et al.

(10) Patent No.: US 11,745,734 B2
(45) Date of Patent: Sep. 5, 2023

(54) METHOD OF PROCESSING IMAGE USING CAMERA OF VEHICLE AND VEHICLE DEVICE

(71) Applicants: HYUNDAI MOTOR COMPANY, Seoul (KR); KIA CORPORATION, Seoul (KR)

(72) Inventors: Dong Hyun Ha, Seoul (KR); Jung Hun Choi, Hwaseong-si (KR); Jae Wung Jung, Bucheon-si (KR)

(73) Assignees: HYUNDAI MOTOR COMPANY, Seoul (KR); KIA Corporation, Seoul (KR)

( * ) Notice: Subject to any disclaimer, the term of this patent is extended or adjusted under 35 U.S.C. 154(b) by 0 days.

(21) Appl. No.: 17/587,725

(22) Filed: Jan. 28, 2022

(65) Prior Publication Data

US 2023/0102056 A1  Mar. 30, 2023

(30) Foreign Application Priority Data

Sep. 27, 2021  (KR) .......................... 10-2021-0126963

(51) Int. Cl.
*B60W 30/09*  (2012.01)
*B60R 1/27*  (2022.01)

(52) U.S. Cl.
CPC .............. *B60W 30/09* (2013.01); *B60R 1/27* (2022.01); *B60R 2300/102* (2013.01); *B60R 2300/205* (2013.01); *B60R 2300/30* (2013.01); *B60R 2300/8093* (2013.01); *B60W 2420/42* (2013.01); *B60W 2510/20* (2013.01)

(58) Field of Classification Search
CPC ............. B60W 30/09; B60W 2420/42; B60W 2510/20; B60R 1/27; B60R 2300/102; B60R 2300/205; B60R 2300/30; B60R 2300/8093
USPC ................................................ 701/107, 111
See application file for complete search history.

(56) References Cited

FOREIGN PATENT DOCUMENTS

| CN | 110576796 | * | 12/2019 | ............... B60R 1/00 |
|---|---|---|---|---|
| CN | 113504962 | * | 10/2021 | ............. G06F 9/451 |
| JP | 2004064441 | * | 2/2004 | ............... B60R 1/00 |
| KR | 10-2017-0049252 A | | 5/2017 | |
| TW | M623110 | * | 2/2022 | ............... B60R 1/00 |
| WO | WO 2010009844 | * | 1/2010 | ............... B60R 1/00 |

\* cited by examiner

*Primary Examiner* — Hai H Huynh
(74) *Attorney, Agent, or Firm* — Morgan, Lewis & Bockius LLP (57) ABSTRACT

A method of processing an image using a camera of a vehicle includes: a first operation of controlling a road wheel of the vehicle according to an imaging mode selected by a user from among a plurality of imaging modes, and a second operation of generating an image according to the imaging mode selected by the user by using the camera while the road wheel of the vehicle is controlled.

21 Claims, 11 Drawing Sheets

METHOD OF PROCESSING IMAGE USING CAMERA OF VEHICLE AND VEHICLE DEVICE

CROSS-REFERENCE TO RELATED APPLICATION(S)

This application claims the benefit of priority to Korean Patent Application No. 10-2021-0126963 filed on Sep. 27, 2021 in the Korean Intellectual Property Office, the disclosure of which is incorporated herein by reference in its entirety.

BACKGROUND

1. Technical Field

The present application relates to a vehicle device and an image processing method using a camera in a vehicle device.

2. Description of Related Art

In general, a vehicle is equipped with a camera for capturing an image, and the camera is generally used to capture an image while driving or parking, such that use of the camera may be very limited.

In this regard, there is an urgent need for a technology capable of capturing images in various modes desired by a user by linking a vehicle camera to a smartphone.

SUMMARY

An aspect of the present disclosure is to provide apparatus, a method or a computer-readable storage medium of processing an image using a vehicle camera capable of capturing images in various modes selected by a user by linking the vehicle camera to a smartphone.

According to an aspect of the present disclosure, a method of processing an image using a camera of a vehicle may include: a first operation of controlling a road wheel of the vehicle according to an imaging mode selected by a user from among a plurality of imaging modes; and a second operation of generating an image according to the imaging mode selected by the user using the camera while the road wheel of the vehicle is controlled.

According to an aspect of the present disclosure, a vehicle device of processing an image using a camera of a vehicle may include: a vehicle control module of controlling a road wheel of the vehicle according to an imaging mode selected by a user from among a plurality of imaging modes; and an image generating module of generating an image according to the imaging mode selected by the user using the camera while the road wheel of the vehicle is controlled.

According to an aspect of the present disclosure, a method of processing an image using a camera of a vehicle may include: a first operation of transmitting an imaging mode selected by a user from among a plurality of imaging modes to the vehicle; and a second operation of receiving an image according to the imaging mode from the vehicle, and displaying the image received according to the imaging mode, wherein the image according to the imaging mode is an image captured using the camera while a road wheel of the vehicle is controlled according to the imaging mode selected by t user.

According to an aspect of the present disclosure, a computer-readable storage medium is provided for recording a program for executing the above-method on a computer.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Hereinafter, various exemplary embodiments in the present disclosure will be described hereinafter with reference to the accompanying drawings. The disclosure may, however, be exemplified in many different forms and should not be construed as being limited to the exemplary embodiments set forth herein. Rather, these embodiments are provided so that this disclosure will be thorough and complete, and will fully convey the scope of the disclosure to those skilled in the art. In the drawings, the same reference numerals will be used throughout to designate the same or like elements, and the shapes and dimensions of elements may be exaggerated for clarity.

Figure 1:
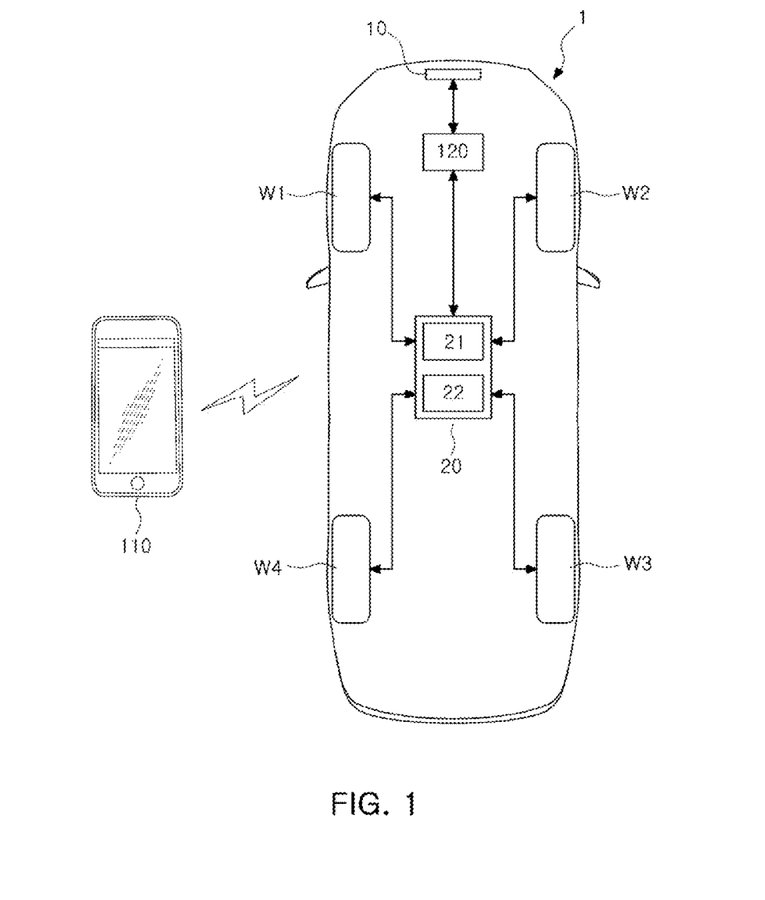
FIG. 1 is a conceptual diagram of an image processing system using a vehicle camera according to an exemplary embodiment of the present disclosure.
Figure 2A:
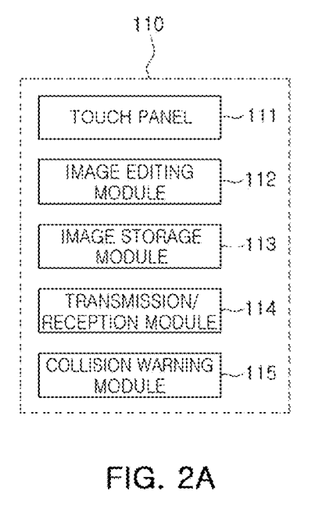
FIG. 2A is an internal block diagram of a user device according to an exemplary embodiment of the present disclosure.
Figure 2B:
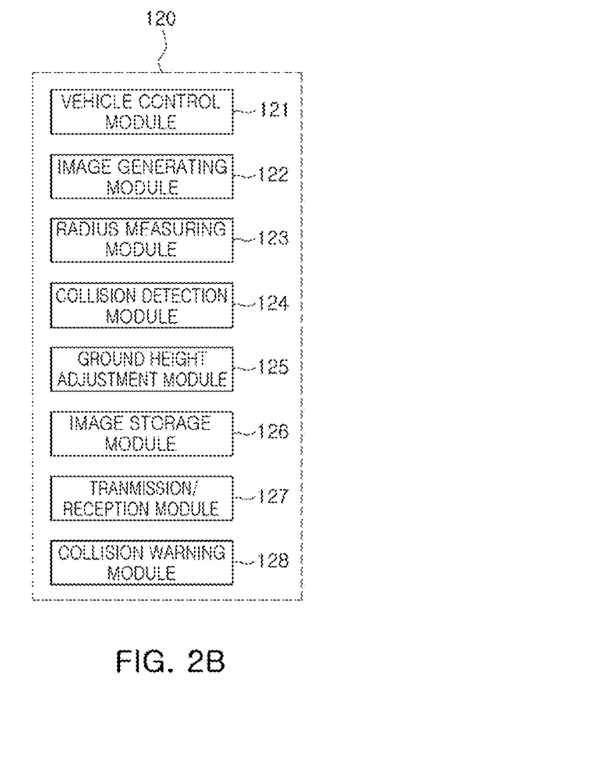
FIG. 2B is an internal block diagram of a vehicle device according to an exemplary embodiment of the present disclosure.

FIG. 1 is a conceptual diagram of an image processing system using a vehicle camera according to an exemplary embodiment of the present disclosure. FIG. 2A is an internal block diagram of a user device according to an exemplary embodiment of the present disclosure, and FIG. 2B is an internal block diagram of a vehicle device according to an exemplary embodiment of the present disclosure.

Figure 3A:
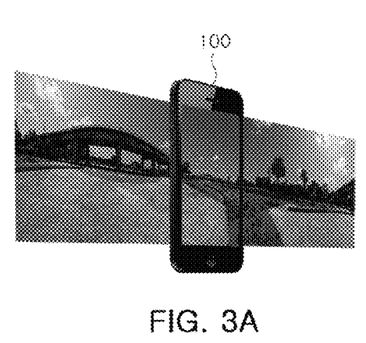
FIGS. 3A, 3B, 3C and 3D are views illustrating an operation for a panoramic imaging mode among a plurality of imaging modes according to an exemplary embodiment of the present disclosure.
Figure 3B:
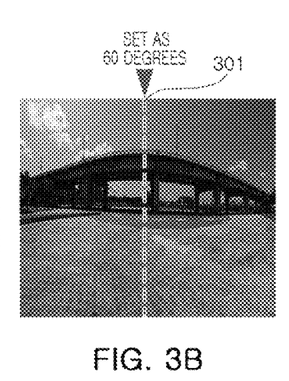
Figure 3C:
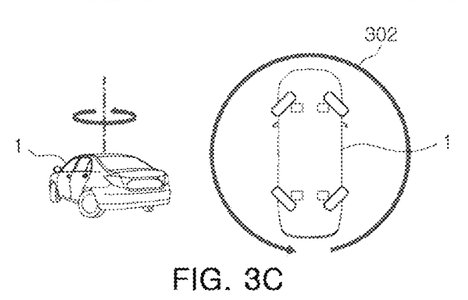
Figure 4A:
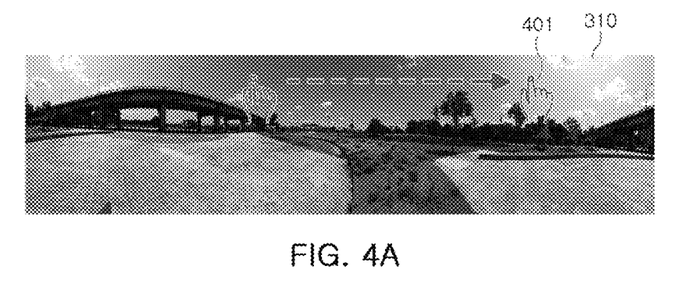
FIGS. 4A and 4B are views illustrating a process of scrolling and editing a pre-generated panoramic image according to an exemplary embodiment of the present disclosure by a user's touch and drag operation.
Figure 4B:
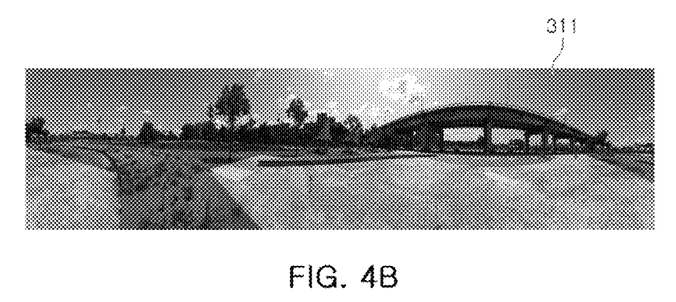

Meanwhile, FIG. 3A-FIG. 3C are diagrams illustrating an operation for a panoramic imaging mode (also referred to as a 'first imaging mode') among a plurality of imaging modes according to an exemplary embodiment of the present disclosure, and FIG. 4A and FIG. 4B are diagrams illustrating a process of scrolling and editing a pre-generated panoramic image according to an exemplary embodiment of the present disclosure by a user's touch and drag operation. FIG. 5A-FIG. 5D are diagrams illustrating an operation for a roundabout imaging mode (also referred to as a 'second imaging mode') among a plurality of imaging modes according to an exemplary embodiment of the present disclosure.

According to an exemplary embodiment of the present disclosure, the panoramic image has an angle of 0 degrees to 360 degrees from left to right according to a rotation angle of the vehicle, and may be an image scrolled left or right by a user touch and drag operation or a video of surroundings captured while the vehicle rotates in place.

In addition, according to an exemplary embodiment of the present disclosure, the roundabout image has an angle of 0 to 360 degrees from left to right according to a rotation angle of the vehicle, may be an image scrolled left or right by a user's touch and drag operation, or may be a video of a subject captured while rotating around the subject. Here, roundabout refers to a driving method at a roundabout such as a rotary, and the roundabout image imaging mode refers to a series of imaging modes capturing images while rotating 360 degrees around a subject at a certain radius.

According to an exemplary embodiment of the present disclosure, a term "pre-control" means a preliminary control. For one example, in the case of a roundabout image imaging mode, a pre-controlling of a road wheel can be performed preliminarily to obtain a user-set radius. Thereafter, by controlling a road wheel, a vehicle may rotate around the subject according to the user-set radius. For another example, in the case of a panoramic image imaging mode, a pre-controlling of a road wheel can be performed preliminarily to display an image captured by the camera and obtain an angle. Thereafter, by controlling a road wheel, a vehicle may rotate 360 degrees in place to generate a panoramic image shifted by the angle.

First, as shown in FIG. 1, a camera 10 and a four-wheel independent control module 20 may be mounted on a vehicle 1 according to an exemplary embodiment of the present disclosure.

The camera 10 may be mounted inside or outside the vehicle 1 to capture an image. Although only one camera is illustrated in FIG. 1, the number thereof may be two or more if necessary.

The four-wheel independent control module 20 is for controlling a steering angle and driving of each of road wheels W1 to W4, and may include a steer-by-wire (SBW) control module for independently controlling the steering angles of the four road wheels, and an in-wheel driving module 22 for independently driving each road wheel by a motor disposed on each of the four road wheels. A technique for controlling the steering angle and driving of the steering wheel through the SBW control module 21 and the in-wheel driving module 22 is a known technique, and thus a detailed description thereof will be omitted in the present disclosure.

Meanwhile, according to an exemplary embodiment of the present disclosure, a user device 100 and a vehicle device 120 for controlling the camera 10 and the four-wheel independent control module 20 provided in the vehicle 1 by linking to the user device 10 may be included.

Hereinafter, an internal block of the user device 110 and the vehicle device 120 and an operation thereof will be described in detail with reference to FIGS. 2A to 5.

First, as shown in FIG. 2A, the user device 110 may be configured to include a touch panel 111, an image editing module 112, an image storage module 113, a transmission/reception module 114, and a collision warning module 115.

Specifically, the touch panel 111 may display an image captured by the camera 10 in real time (see FIG. 3A), or may receive an imaging mode selected by a user from among a plurality of imaging modes. The received imaging mode may be transmitted to the vehicle device 120 through a transmission/reception module 114 to be described later. The plurality of imaging modes described above may include a panoramic imaging mode or a roundabout imaging mode.

In addition, the touch panel 111 may display an image according to the imaging mode received from the vehicle device 120. In this case, the image according to the above-described imaging mode may be an image captured by the camera 10 while the road wheel of the vehicle 1 is controlled through the four-wheel independent control module 20 according to the selected imaging mode.

According to an exemplary embodiment of the present disclosure, when the input imaging mode is the panoramic image imaging mode, the road wheel of the vehicle 1 may be controlled to rotate 360 degrees in place (see 302 of FIG. 3C), and the image according to the imaging mode may be a panoramic image of surroundings captured using the camera 10 while the road wheel of the vehicle 1 is controlled.

Figure 3D:
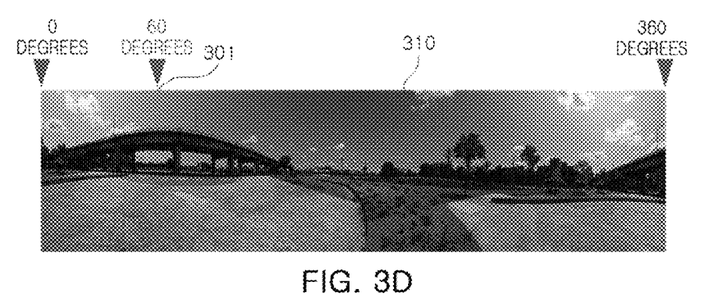

Such a panoramic image may have an angle of 0 degrees to 360 degrees from left to right according to a rotation angle of the vehicle 1 (see 310 of FIG. 3D).

In addition, according to an exemplary embodiment of the present disclosure, the pre-generated panoramic image (see 310 of FIG. 4A) may be scrolled left or right by the user's touch and drag operation (see 401 of FIG. 4A) and may be edited into a new panoramic image (see 311 of FIG. 4B).

In addition, according to an exemplary embodiment of the present disclosure, the road wheel of the vehicle 1 may be pre-controlled to rotate 360 degrees in place according to the above-described panoramic image imaging mode, and the touch panel 111 may display an image captured by the camera 10 while the road wheel of the vehicle 1 is pre-controlled (see FIG. 3A).

In this case, the touch panel 111 may receive a focus point designated by a user among the displayed images (see 301 of FIG. 3B) and an angle at which the focus point is to be located among panoramic images (60 degrees of FIG. 3B). Thereafter, the image editing module 112 may shift a panoramic image so that the focus point 301 is located at the input angle, and generate a panoramic image (see 310 of FIG. 3D).

Meanwhile, according to an exemplary embodiment of the present disclosure, when the input imaging mode is a roundabout image imaging mode, the road wheel of the vehicle 1 may be controlled to rotate around a subject (see FIG. 5C), and the image according to the imaging mode may be a roundabout image obtained by imaging the subject from different angles with the camera 10 while the road wheel of the vehicle 1 is controlled.

Although not shown in the drawing, the roundabout image may also have an angle of 0 to 360 degrees from left to right depending on a rotation angle of the vehicle 1, and may be scrolled left or right by a user's touch and drag operation to and be stored as a panoramic image.

Figure 5A:
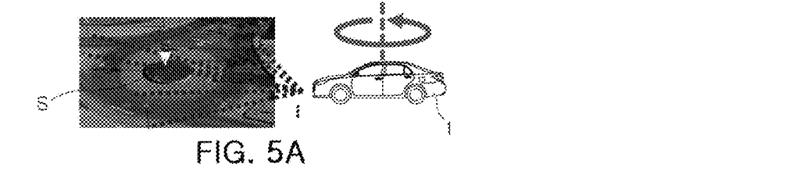
FIGS. 5A, 5B, 5C and 5D are views illustrating an operation for a roundabout imaging mode among a plurality of imaging modes of an exemplary embodiment of the present disclosure.
Figure 5B:
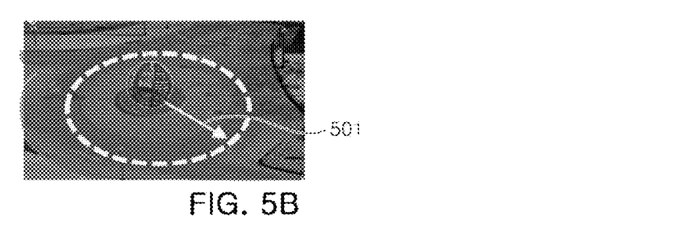

In addition, according to an exemplary embodiment of the present disclosure, the road wheel of the vehicle 1 may be pre-controlled to rotate left and right at a predetermined angle around a subject S according to the roundabout image imaging mode (see FIG. 5A). The predetermined angle may be any one of 0 degrees to 360 degrees.

An imagable radius (see 501 of FIG. 5B), which may be defined as a radius in which roundabout imaging is possible based on a distance from the subject S to an adjacent obstacle while the road wheel of the vehicle 1 is pre-controlled, may be received. In this case, the touch panel 111 may receive a user-set radius designated by a user from among the received imagable radii. Here, the user-set radius may be smaller than the imagable radius. The input user-set radius may be transmitted to the vehicle 1 through the transmission/reception module 114. Thereafter, the vehicle 1 may rotate around the subject S according to the user-set radius (refer to FIG. 5C).

The image storage module 113 may store the image edited by the above-described image editing module 112.

The transmission/reception module 114 is a module for transmitting/receiving various data with the vehicle device 120. In particular, the stored images may be transmitted to an external server, a telematics center (TMS), or the like through the transmission/reception module 114.

When a collision warning alarm is received from the vehicle device 120, the collision warning module 115 may output the collision warning alarm with at least one method of sound, a visual warning, and vibrations. For example, by outputting a message "risk of collision" through the touch panel 111, or outputting the message of "risk of collision" in a form of voice or vibration, it can alert the user of the risk of collision.

The collision warning alarm described above may be generated by the vehicle device 120, and may be generated when a risk of collision with an adjacent obstacle is sensed when the road wheel of the vehicle is controlled based on a distance from the adjacent obstacle.

According to an exemplary embodiment of the present disclosure, the above-described user device 110 may be a smartphone or a device mounted inside a vehicle. Here, the smartphone may be a mobile terminal of various names, such as a mobile phone, a personal digital assistant (PDA), a tablet personal computer (PC), a notebook, and the like, and the device mounted inside the vehicle may be, for example, a device including any one of a cluster, a center information display (CID), a head up display (HUD), a room mirror display (RMD), and a center fascia display.

Meanwhile, as shown in FIG. 2B, the vehicle device 120 may be configured to include a vehicle control module 121, an image generating module 122, a radius measuring module 123, a collision detection module 124, and a ground height adjustment module 125, an image storage module 126, a transmission/reception module 127, and a collision warning module 128.

According to an exemplary embodiment of the present disclosure, the vehicle device 120 may include a processor (e.g., computer, microprocessor, CPU, ASIC, circuitry, logic circuits, etc.) and an associated non-transitory memory storing software instructions which, when executed by the processor, provides the functionalities of the vehicle control module 121, the image generating module 122, the radius measuring module 123, the collision detection module 124, and the ground height adjustment module 125, the image storage module 126, the transmission/reception module 127, and the collision warning module 128. Herein, the memory and the processor may be implemented as separate semiconductor circuits. Alternatively, the memory and the processor may be implemented as a single integrated semiconductor circuit. The processor may embody one or more processor(s).

Specifically, the vehicle control module 121 may control the road wheel of the vehicle 1 through the four-wheel independent control module 20 according to the imaging mode selected by the user among the plurality of imaging modes, and the image generating module 122 may generate an image according to the imaging mode using the camera 10 while the road wheel of the vehicle 1 is controlled. The generated image may be stored in the image storage module 126, and may be transmitted to the user device 110 through the transmission/reception module 127. Here, the transmission/reception module 127 according to an exemplary embodiment of the present disclosure may be a hardware device implemented by various electronic circuits, e.g., transceiver, etc., to transmit and receive signals via wireless or wired connections.

According to an exemplary embodiment of the present disclosure, when the selected imaging mode is a panoramic image imaging mode, the vehicle control module 121 may control the road wheel of the vehicle 1 to rotate 360 degrees in place (see 302 of FIG. 3C), the image generating module 122 may generate a panoramic image of surroundings captured using the camera 10 while the road wheel of the vehicle 1 is controlled.

In addition, according to an exemplary embodiment of the present disclosure, when the imaging mode is a roundabout image imaging mode, the vehicle control module 121 may control the road wheel of the vehicle 1 to rotate around a subject S (FIG. 5C), and the image generating module 122 may generate a roundabout image (see 510 of FIG. 5D) using the camera 10 while the road wheel of the vehicle 1 is controlled.

In addition, according to an exemplary embodiment of the present disclosure, when a roundabout image imaging mode is received, the vehicle control module 121 may pre-control the road wheel of the vehicle 1 to rotate left and right at a predetermined angle around the subject S. (see FIG. 5A).

The radius measuring module 123 may measure a distance from a subject to an adjacent obstacle while the road wheel of the vehicle 1 is pre-controlled, and an imagable radius in which roundabout imaging is possible (see 501 of FIG. 5B) may be obtained. To this end, the radius measuring module 123 may use various sensors such as a lidar sensor, a radar sensor, a camera, and a proximity sensor, but is not limited thereto. The imagable radius may be transmitted to the user device 110 through the transmission/reception module 127.

Figure 5C:
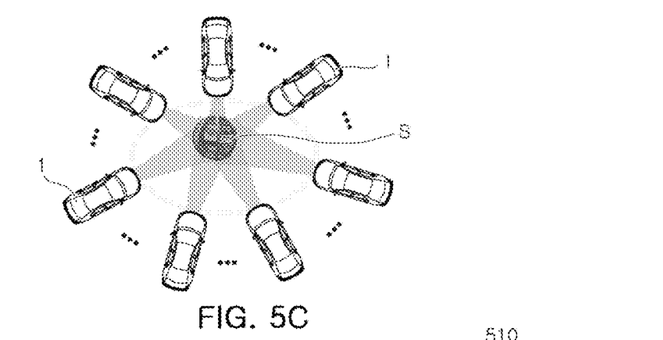
Figure 5D:
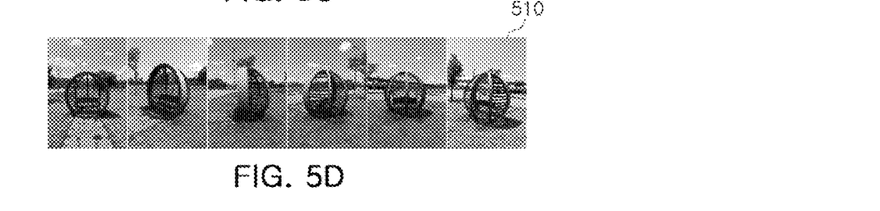

Thereafter, when a user-set radius is received from the user device 110 through the transmission/reception module 127, the vehicle control module 121 may control the vehicle 1 to rotate around the subject S received according to the user set radius (see FIG. 5C).

In addition, the collision detection module 124 may detect a risk of collision with an adjacent obstacle when the road wheel of the vehicle 1 is controlled, and may generate a collision warning alarm when the risk of collision is detected. The generated collision warning alarm may be transmitted to the user device 110 and output. That is, when the vehicle 1 rotates in place or when the road wheel of the vehicle 1 is controlled or pre-controlled, such as when the vehicle 1 rotates around a subject, the vehicle may collide with surrounding obstacles, so it is detected in advance and the user is notified.

The collision warning module 128 may output at least one of sound, visual, or vibration when a collision risk is detected. For example, by displaying a message of "risk of collision", outputting the message of "risk of collision" in a form of voice in a form of vibration, the user can be informed of the risk of collision. Here, the collision warning module 128 according to an exemplary embodiment of the present disclosure may be a speaker, a display, a vibration-actuating device, etc., but is not limited thereto.

The ground height adjustment module 125 may perform a function of adjusting a ground height of a vehicle by controlling suspension. This is to adjust the height of the panoramic image or the roundabout image by adjusting the height of the camera 10.

The transmission/reception module 127 is a module for transmitting/receiving various data with the user device 110. In particular, the stored images may be transmitted to an external server or a telematics center (TMS) through the transmission/reception module 127.

As described above, according to an exemplary embodiment of the present disclosure, an image in various modes desired by a user may be captured by linking the camera of the vehicle camera and the smartphone.

Figure 6:
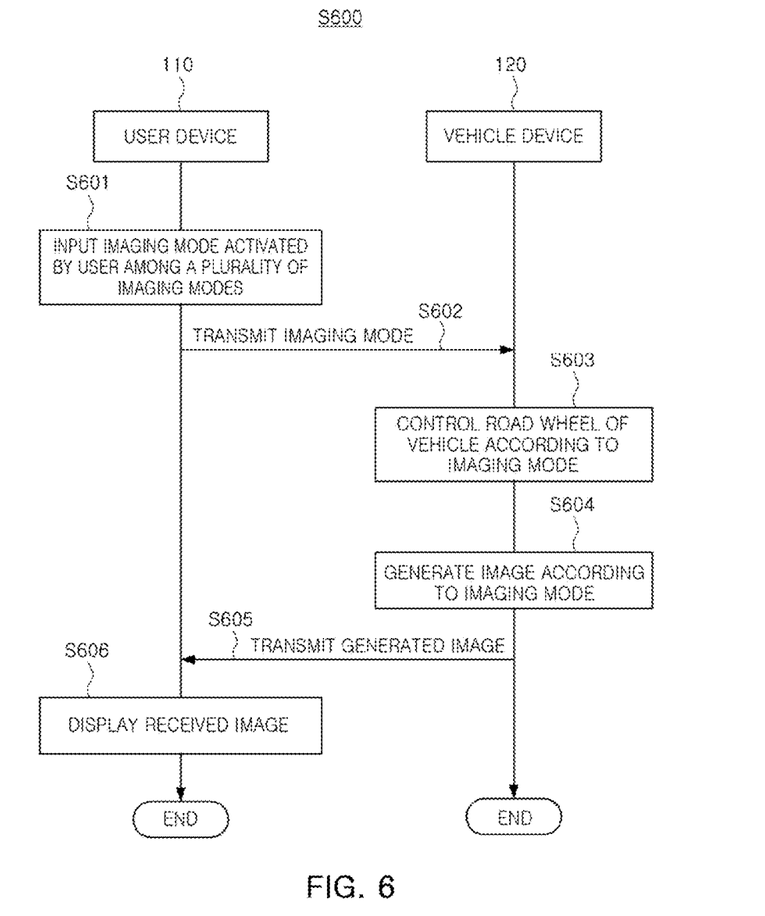
FIG. 6 is a flowchart illustrating an image processing method according to an exemplary embodiment of the present disclosure.
Figure 7:
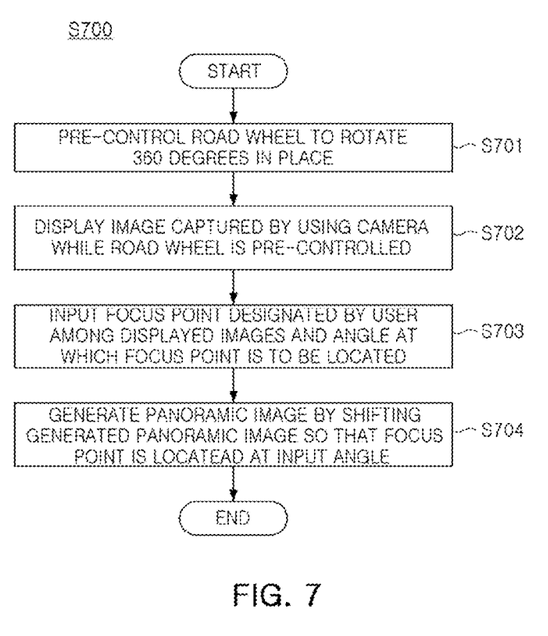
FIG. 7 is a view illustrating an operation by pre-controlling a road wheel of a vehicle in the case of a panoramic imaging mode according to an exemplary embodiment of the present disclosure.
Figure 8:
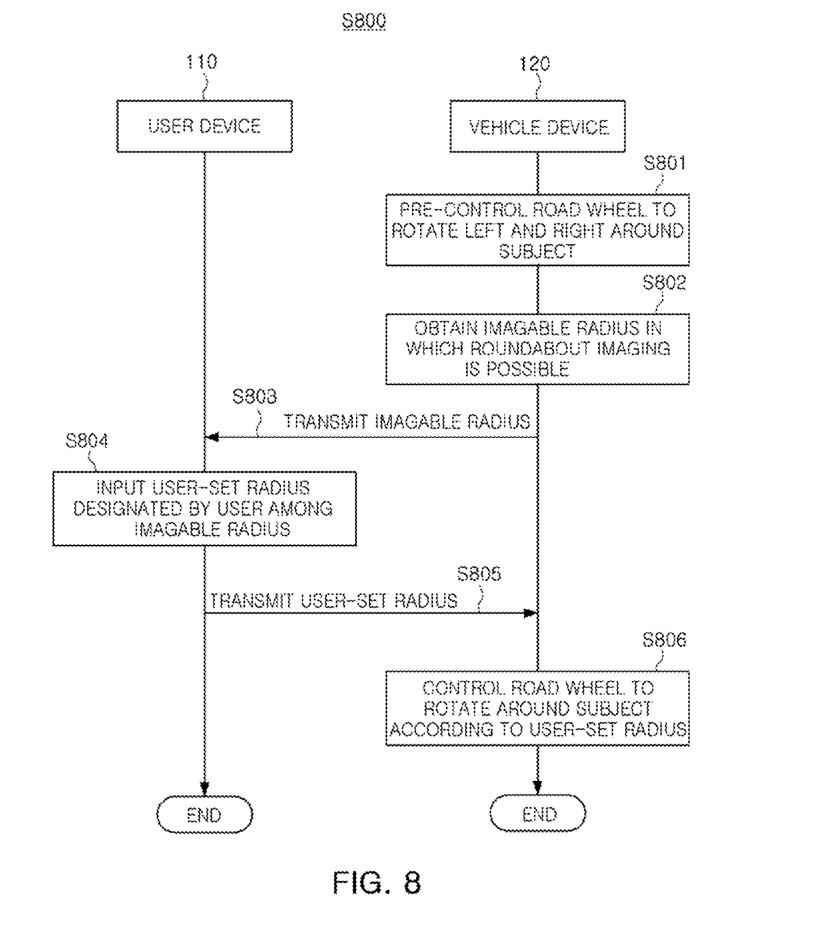
FIG. 8 is a view illustrating an operation by pre-controlling a road wheel of a vehicle in the case of a roundabout imaging mode according to an exemplary embodiment of the present disclosure.

Finally, FIG. 6 is a flowchart illustrating a method of processing an image according to an exemplary embodiment of the present disclosure. FIG. 7 is a view illustrating an operation by a pre-control of a road wheel of a vehicle in the case of a panoramic image imaging mode according to an exemplary embodiment of the present disclosure, and FIG. 8 is a view illustrating an operation by a pre-control of a road wheel of a vehicle in the case of a roundabout image imaging mode according to an exemplary embodiment of the present disclosure.

Hereinafter, a method of processing an image according to an exemplary embodiment of the present disclosure (S600) will be described with reference to FIGS. 1 to 8.

First, referring to FIGS. 1 to 6, the method of processing an image (S600) according to an exemplary embodiment of the present disclosure may be initiated by an operation of receiving an imaging mode selected by a user from among a plurality of imaging mode, in a touch panel 111 of a user device 110 (S601).

Thereafter, a transmission/reception module 114 of the user device 110 may transmit an imaging mode to a vehicle device 120 (S602).

Next, a transmission/reception module 127 of the vehicle device 120 may receive an imaging mode, and transmit the received imaging mode to a vehicle control module 121, and thereafter, the vehicle control module 121 of the vehicle device 120 may control a road wheel of a vehicle 1 received according to the imaging mode through a four-wheel independent control module (S603).

An image generating module 122 of the vehicle device 120 may generate an image according to the imaging mode by using a camera 10 while the road wheel of the vehicle 1 is controlled (S604).

Thereafter, the transmission/reception module 127 of the vehicle device 120 may transmit the generated image to the user device 110 (S605).

Finally, the transmission/reception module 114 of the user device 110 may receive an image and transmit the received image to a touch panel 111, and the touch panel 111 of the user device 110 may display the received image (S606).

According to an exemplary embodiment of the present disclosure, in the touch panel 111 of the user device 110, the method of processing an image may further include an operation of scrolling the displayed image (see 310 of FIG. 4A) left and right through a user touch and drag operation (see 401 of FIG. 4A); and an operation of storing a panoramic image scrolled in an image editing module 112 of the user device 110 (see 311 of FIG. 4B) in an image storage module 113.

Meanwhile, according to an exemplary embodiment of the present disclosure, when the input imaging mode is a panoramic image imaging mode, the operation of S603 may include an operation of controlling a road wheel of the vehicle 1 to rotate 360 degrees in place (see 302 of FIG. 3C), and in the operation of S604, while the road wheel of the vehicle 1 is controlled, a panoramic image of surroundings captured by using the camera 10 may be generated.

According to an exemplary embodiment of the present disclosure, the method of processing an image may further include an operation of pre-controlling a road wheel of the vehicle 1 in a panoramic image imaging mode. Hereinafter, an operation of the pre-controlling the road wheel of the vehicle will be described with reference to FIGS. 1 to 7.

As shown in FIGS. 1 to 7, in an operation of pre-controlling a road wheel of a vehicle (S700), in the vehicle control module 121 of the vehicle device 120, when a panoramic imaging mode is received, a road wheel of a vehicle 1 may be pre-controlled to rotate 360 degrees in place (S701).

Thereafter, a touch panel 111 of a user device 110 may display an image (see FIG. 3A) captured by using the camera 10 while the road wheel of the vehicle 1 is pre-controlled (S702).

Next, the touch panel 111 of the user device 110 may receive a focus point designated by a user among the displayed images (see 301 of FIG. 3B) and an angle at which a focus point is to be located among panoramic images (see 60 degrees of FIG. 3B) (S703).

Finally, the image editing module 112 of the user device 110 may generate a panoramic image (see 310 of FIG. 3D) in which the pre-generated panoramic image is shifted so that a focus point is located at an input angle (S704).

Meanwhile, according to an exemplary embodiment of the present disclosure, when the input imaging mode is a roundabout image imaging mode, the operation of S603 may include an operation of controlling a road wheel of a vehicle 1 to rotate around a subject (see FIG. 5C), and in the operation of S604, while the road wheel of the vehicle 1 is controlled, a roundabout image (see 510 of FIG. 5D) obtained by imaging the subject from different angles through a camera may be generated.

In addition, according to an exemplary embodiment of the present disclosure, the method of processing an image may further include an operation of pre-controlling a road wheel of a vehicle in an imaging mode of the roundabout image imaging mode. Hereinafter, the operation of pre-controlling the road wheel of the vehicle will be described with reference to FIGS. 1 to 6 and 8.

As shown in FIGS. 1 to 6 and 8, in an operation of pre-controlling a road wheel of a vehicle, in the vehicle control module 121 of the vehicle device 120, when a panoramic imaging mode is received, the road wheel of the vehicle 1 may be pre-controlled (see FIG. 5A) to rotate left and right at a predetermined angle around a subject (S801).

In this case, the radius measuring module 123 of the vehicle device 120 may measure a distance from a subject to an adjacent obstacle while the road wheel of the vehicle 1 is pre-controlled, and an imagable radius (see 501 of FIG. 5B) in which roundabout imaging is possible based on the measured distance may be obtained (S802).

Thereafter, the transmission/reception module 127 of the vehicle device 120 may transmit the imagable radius to the user device 110 (S803).

Thereafter, the touch panel 111 of the user device 110 may receive a user-set radius designated by a user among the received imagable radii (S804). The input user-set radius may be transmitted to the vehicle device 120 (S805).

Finally, the vehicle control module 121 of the vehicle device 120 may control the road wheel of the vehicle 1 to rotate around the subject (see 501 of FIG. 5C) received according to the user-set radius (S806).

Figure 9:
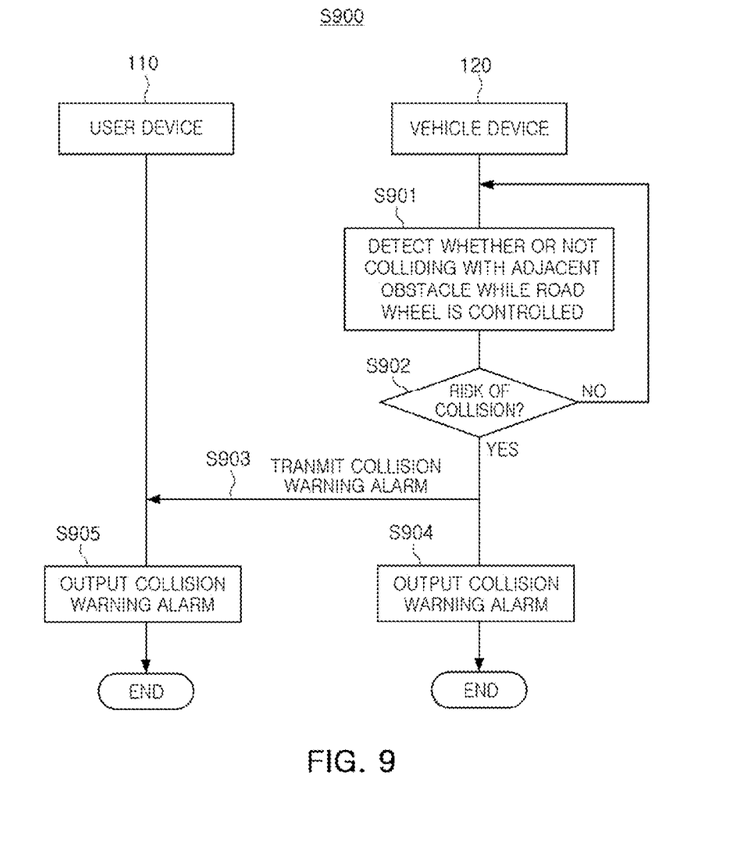
FIG. 9 is a diagram illustrating a process of outputting a collision warning alarm by collision detection during pre-control or control of a vehicle.

Meanwhile, FIG. 9 is a diagram illustrating a process of outputting a collision warning alarm by collision detection during pre-control or control of a road wheel of a vehicle (S900).

Specifically, the collision detection module 124 of the vehicle device 120 may detect whether a vehicle collides with an adjacent obstacle based on a distance from the adjacent obstacle while a road wheel of the vehicle is controlled (S901).

If there is a risk of collision (S902), the collision detection module 124 may transmit a collision warning alarm to the user device 110 (S903).

Thereafter, the user device 110 may output a collision warning alarm in the form of at least one of sound, visual, or vibration (S905).

Separately, the collision warning alarm may also be output in at least one form of sound, visual, and vibration in the collision warning module 128 of the vehicle device 120 (S904).

In addition, according to an exemplary embodiment of the present disclosure, the method of processing the image may further include an operation of adjusting a ground height of the vehicle 1 in the ground height adjustment module 125 of the vehicle device 120. This is to adjust a height of the panoramic image or the roundabout image by adjusting the height of the camera 10.

In addition, according to an exemplary embodiment of the present disclosure, the method of processing an image may further include an operation of scrolling a pre-generated image (a panoramic image or a roundabout image) left and right through a user touch and drag operation; and an operation of storing the scrolled image, as above.

Figure 10:
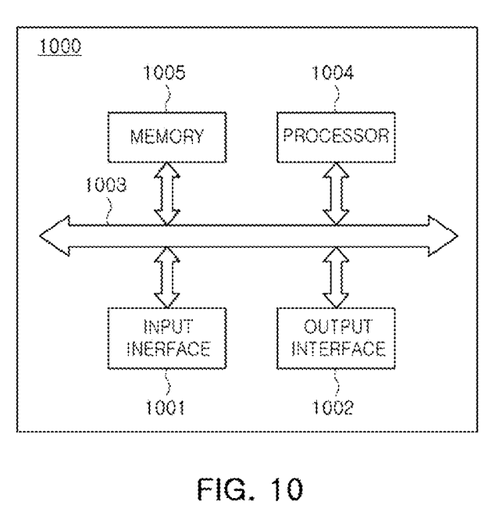
FIG. 10 is another block diagram of a device an exemplary embodiment of the present disclosure.

Meanwhile, FIG. 10 is another block diagram of a device according to an exemplary embodiment of the present disclosure which may be commonly applied to the user device illustrated in FIG. 2A or the vehicle device illustrated in FIG. 2B.

As shown in FIG. 10, a device 100 may include an input interface 1001, an output interface 1002, a processor 1004, and a memory 1005, and the input interface 1001, the output interface 1002, the processor 1004, and the memory 1005 may be interconnected via a system bus 1003.

The memory 1005 is used to store a program, a command or a code, and the processor 1004 executes the program, the command or the code stored in the memory 1005, controls the input interface 1001 to receive a signal, controls the output interface 1002 to transmit a signal, and performs an operation of the user device or the vehicle device described above.

In an exemplary embodiment of the present disclosure, it should be understood that the processor 1004 may be a central processing unit (CPU), another general-purpose processor, a digital signal processor (DSP), an application specific integrated circuit (ASIC), a field programmable gate array (FPGA), or other programmable logic devices, a discrete gate or a transistor logic device, a discrete hardware component, or the like. The general purpose processor may be a microprocessor, or the processor may be any conventional processor, or the like.

In addition, the memory 1005 may include a read-only memory and a random access memory, and may provide instructions and data to processor 1004.

In various exemplary embodiments of the present disclosure, each method of FIGS. 6 to 8 may be achieved by an integrated logic circuit of hardware or an instruction in a form of software in the processor 1004. The content of the method disclosed in relation to the embodiment of the present disclosure may be implemented to be performed and completed by a hardware processor, or may be performed and completed by a combination of hardware and software modules of the processor. The software module may be disposed in a storage medium skilled in the art, such as a random access memory, a flash memory, a read-only memory, a programmable read-only memory or an electrically erasable programmable memory, a register, and the like. The corresponding storage medium is located in the memory 1005, and the processor 1004 reads information from the memory 1005 and implements the contents of the above-described method in combination with hardware. In order to avoid duplication, detailed descriptions thereof are omitted herein.

In one exemplary embodiment, the transmission/reception module 114 of the terminal device 110 illustrated in FIG. 2A and the transmission/reception module 127 of the vehicle device 120 illustrated in FIG. 2B may be implemented by the input interface 1001 and the output interface 1002 illustrated in FIG. 9, and the image editing module 112 illustrated in FIG. 2A, the vehicle control module 121, the image generating module 122, the radius measuring module 123, the collision detection module 124, and the ground height adjustment module 125, illustrated in FIG. 2B may be implemented in the processor 1004 shown in FIG. 9, and the image storage module 113 illustrated in FIG. 2A and the image storage module 126 illustrated in FIG. 2B may be implemented by the memory 1005 illustrated in FIG. 9.

As described above, according to an exemplary embodiment of the present disclosure, an image in various modes desired by a user may be captured by linking the camera of the vehicle to the smartphone.

As set forth above, according to an exemplary embodiment of the present disclosure, images in various modes desired by a user may be captured by linking a vehicle camera to a smartphone.

While the various exemplary embodiments have been illustrated and described above, it will be apparent to those skilled in the art that modifications and variations could be made without departing from the scope of the present disclosure as defined by the appended claims.

What is claimed is:

1. A method of processing an image using a camera of a vehicle, the method comprising:
 a first operation of controlling a road wheel of the vehicle according to an imaging mode selected by a user from among a plurality of imaging modes; and
 a second operation of generating an image according to the imaging mode selected by the user using the camera while the road wheel of the vehicle are controlled,
 wherein the plurality of imaging modes comprise:
 a first imaging mode capturing surroundings of the vehicle while the vehicle rotates in place; and
 a second imaging mode capturing a subject while the vehicle rotates around the subject.

2. The method of processing an image of claim 1, wherein, in the first imaging mode, the first operation comprises an operation of controlling the road wheel of the vehicle to rotate 360 degrees in place, and the second operation comprises an operation of generating a panoramic image of surroundings captured using the camera while the road wheel of the vehicle is controlled, wherein the panoramic image has an angle of 0 degrees to 360 degrees from left to right according to a rotation angle of the vehicle, and is an image scrolled left or right by a user's touch and drag operation or a video of surroundings captured while the vehicle rotates in place.

3. The method of processing an image of claim 2, the method further comprising an operation of pre-controlling the road wheel of the vehicle to rotate 360 degrees in place, wherein the generated panoramic image is an image shifted so that a focus point is located at an angle input by the user while the road wheel of the vehicle is pre-controlled.

4. The method of processing an image of claim 1, wherein in the case of the second imaging mode, the first operation comprises an operation of controlling the road wheel of the vehicle to rotate according to a user-set radius around the subject, and the second operation comprises an operation of generating a roundabout image in which the subject is captured from different angles with the camera while the road wheel of the vehicle is controlled, wherein the roundabout image has an angle of 0 degrees to 360 degrees from left to right according to a rotation angle of the vehicle, and is an image scrolled left or right by a user's touch and drag operation or a video capturing the subject while rotating around the subject.

5. The method of processing an image of claim 4, the method further comprising an operation of pre-controlling the road wheel of the vehicle to rotate left and right at a predetermined angle around the subject, wherein the user-set radius is a value smaller than an imagable radius obtained based on a distance measured from the subject to an adjacent obstacle while the road wheel of the vehicle is pre-controlled.

6. The method of processing an image of claim 1, the method further comprising an operation of generating a collision warning alarm based on a distance from the vehicle to an adjacent obstacle when controlling the road wheel of the vehicle; and an operation of transmitting the collision warning alarm externally or outputting the collision warning alarm in a form of at least one of sound, visual, or vibration.

7. A vehicle device of processing an image using a camera of a vehicle, the vehicle device comprising:

a vehicle control module of controlling a road wheel of the vehicle according to an imaging mode selected by a user from among a plurality of imaging modes; and an image generating module of generating an image according to the imaging mode selected by the user using the camera while the road wheel of the vehicle is controlled, wherein the plurality of imaging modes comprise:

a first imaging mode capturing surroundings of a vehicle while the vehicle rotates in place; and a second imaging mode capturing the subject while the vehicle rotates around the subject.

8. The vehicle device of claim 7, wherein in the case of the first imaging mode, the vehicle control module controls the road wheel of the vehicle to rotate 360 degrees in place, and the image generating module generates a panoramic image of surroundings captured using the camera while the road wheel of the vehicle is controlled, wherein the panoramic image has an angle of 0 degrees to 360 degrees from left to right according to a rotation angle of the vehicle, and is an image scrolled left or right by a user's touch and drag operation or a video of surroundings captured while the vehicle rotates in place.

9. The vehicle device of claim 8, wherein the vehicle control module pre-controls the road wheel of the vehicle to rotate 360 degrees in place, wherein the generated panoramic image is an image shifted so that a focus point is located at an angle input by the user while the road wheel of the vehicle is pre-controlled.

10. The vehicle device of claim 7, wherein in the case of the second imaging mode, the vehicle control mode controls the road wheel of the vehicle to rotate according to a user-set radius around the subject, and the image generating module generates a roundabout image capturing the subject at different angles with the camera while the road wheel of the vehicle is controlled, wherein the roundabout image has an angle of 0 degrees to 360 degrees from left to right according to a rotation angle of the vehicle, and is an image scrolled left or right by a user's touch and drag operation or a video capturing the subject while rotating around the subject.

11. The vehicle device of claim 10, wherein the vehicle control module pre-controls the road wheel of the vehicle to rotate left and right at a predetermined angle around the subject, wherein the user-set radius is a value smaller than an imagable radius obtained based on a distance measured from the subject to an adjacent obstacle while the road wheel of the vehicle is pre-controlled.

12. The vehicle device of claim 7, further comprising:

a collision detection module for generating a collision warning alarm generated based on a distance from the vehicle to an adjacent obstacle when controlling the road wheel of the vehicle; and a transmission and reception module for transmitting the collision warning alarm externally or a collision warning module for outputting the collision warning alarm in a form of at least one of sound, visual or vibration.

13. The vehicle device of claim 7, wherein the imaging mode selected by the user is received from a user device.

14. The vehicle device of claim 13, wherein the user device is a smartphone or a device mounted inside the vehicle.

15. The vehicle device of claim 14, wherein the device mounted inside the vehicle comprises at least one of a cluster, a center information display (CID), a head up display (HUD), a room mirror display (RMD) or a center fascia display.

16. A method of processing an image using a camera of a vehicle, the method comprising:

a first operation of transmitting an imaging mode selected by a user from among a plurality of imaging modes to the vehicle; and a second operation of receiving an image according to the imaging mode from the vehicle, and displaying the image received according to the imaging mode, wherein the image according to the imaging mode is an image captured using the camera while a road wheel of the vehicle is controlled according to the imaging mode selected by the user, and wherein the plurality of imaging modes comprise:

a first imaging mode capturing surroundings of the vehicle while the vehicle rotates in place; and a second imaging mode capturing the subject while the vehicle rotates around the subject.

17. The method of processing an image of claim 16, wherein in the case of the first imaging mode, the road wheel of the vehicle is controlled to rotate 360 degrees in place, and the image according to the imaging mode is a panoramic image of surroundings captured using the camera while the road wheel of the vehicle is controlled, wherein the panoramic image has an angle of 0 degrees to 360 degrees from left to right according to a rotation angle of the vehicle, and is an image scrolled left or right according to a user's touch and drag operation or a video of surroundings captured while the vehicle rotates in place.

18. The method of processing an image of claim 17, wherein the road wheel of the vehicle is pre-controlled to rotate 360 degrees in place, and the generated panoramic image is an image shifted so that a focus point is located at an angle input by the user while the road wheel of the vehicle is pre-controlled.

19. The method of processing an image of claim 18, wherein the road wheel of the vehicle is pre-controlled to rotate left and right at a predetermined angle around the subject, wherein the user-set radius is a value smaller than an imagable radius obtained based on a distance measured from the subject to an adjacent obstacle while the road wheel of the vehicle is pre-controlled.

20. The method of processing an image of claim 16, wherein, in the case of the second imaging mode, the road wheel of the vehicle is controlled to rotate according to a user-set radius around the subject, wherein the image according to the imaging mode is a roundabout image in which the subject is captured at different angles with the camera while the road wheel of the vehicle is controlled, wherein the roundabout image has an angle of 0 degrees to 360 degrees from left to right according to a rotation angle of the vehicle, and is an image scrolled left or right by a user's touch and drag operation or a video of the subject captured while rotating around the subject.

21. The method of processing an image claim 16, the method further comprising:

an operation of receiving a collision warning alarm generated based on a distance from the vehicle to an adjacent obstacle; and an operation of outputting the received collision warning alarm in a form of at least one of sound, visual or vibration.

* * * * *